United States Patent [19]

Rising

[11] 3,937,573

[45] Feb. 10, 1976

[54] EXPOSURE CONTROL APPARATUS FOR PHOTOGRAPHIC PRINTERS

[75] Inventor: Bradley D. Rising, Rochester, N.Y.

[73] Assignee: Eastman Kodak Company, Rochester, N.Y.

[22] Filed: Aug. 12, 1974

[21] Appl. No.: 496,596

[52] U.S. Cl. .................................. 355/83; 355/35
[51] Int. Cl.² ........................................ G03B 27/78
[58] Field of Search .................... 355/83, 67–71, 355/35–38

[56] References Cited
UNITED STATES PATENTS

| | | | |
|---|---|---|---|
| 3,168,860 | 2/1965 | Clerk et al. ............................ | 355/83 |
| 3,519,347 | 7/1970 | Bowker et al. ...................... | 355/38 X |
| 3,527,540 | 9/1970 | Bowker et al. ...................... | 355/38 X |
| 3,612,683 | 10/1971 | Riley et al. ............................ | 355/35 |
| 3,642,377 | 2/1972 | Young .................................. | 355/83 X |
| 3,694,074 | 9/1972 | Huboi et al. .......................... | 355/38 |
| 3,709,601 | 1/1973 | Zahn et al. ........................... | 355/35 X |
| 3,724,947 | 4/1973 | Paulus .................................. | 355/38 |

Primary Examiner—Richard L. Moses
Attorney, Agent, or Firm—G. E. Grosser

[57] ABSTRACT

An exposure control apparatus for use in photographic printers assigns the originals which are received for printing to groups or sets, for example, according to filmstrip membership, and bases the printing exposure for each such original, at least in part, on characteristics determined for a corresponding set taken as a whole. In a presently preferred apparatus, the exposures for individual frames from a filmstrip are controlled in accordance with the average optical density for the overall filmstrip in selectively weighted combination with individual frame, optical density characteristics.

7 Claims, 4 Drawing Figures

EXPOSURE CONTROL APPARATUS FOR PHOTOGRAPHIC PRINTERS

BACKGROUND OF THE INVENTION

1. Field of the Invention

The present invention relates to automatic, exposure control devices for use in photographic printers, and more particularly, to such devices which determine exposures based on the characteristics of the photographic originals which are received for printing.

2. Description Relative to the Prior Art

It is well known to examine the characteristics, particularly the optical density characteristics, of a photographic original to determine exposure time to be used in the printing of that original. Most automatic exposure controllers for photographic printers utilize this basic examination approach in exposure determination. Such controllers typically compare the characteristics (e.g. brightness and tone balance) of the original against empirically determined "norms" in selecting exposures for printing. One shortcoming of this type of exposure control is that printing errors tend to occur in situations where a photographer has purposely departed from picture-taking norms in producing a particular original.

For each printing error, a "remake" (reprinting) is performed which requires individualized handling of the original which was unsatisfactorily copied and, attendantly, individualized handling of the customer order to which the reprinted copy belongs. Because of this special handling, each "remake" entails a tremendous increase in cost in comparison with a print routinely produced by the automatic printer.

A number of automatic printing techniques have been developed to reduce "remake" occurrences, and thus keep costs down. In one approach only a portion of the original is examined for optical density; the examined portion being selected to have a high likelihood of including the principal subject. In some of the more sophisticated techniques, comparisons are made of densities measured for two or more portions of the original (see U.S. Pat. Nos. 3,677,641 and 3,708,676).

The idea underlying these automated efforts to reduce "remake" occurrences is typically one of extracting from the original that information which is most effective for exposure control purposes. Or, considered another way, a characteristic is sought, by limiting and refining the examination of the original, which is more universally effective as a basis for exposure control.

The refined or specialized examination techniques have, to some degree, proven successful in reducing printing errors. There remains, nevertheless, a significant population of originals for which present exposure control techniques tend to produce overcorrected exposures with the consequence of removing desired photographic effects. For the most part that population includes originals which are purposely unusual in subject matter, subject placement, or tone balance. With such originals it is difficult, and frequently impossible, to extract, based on image-related characteristics, sufficient information to indicate satisfactory printing exposures.

SUMMARY OF THE INVENTION

The present invention is premised in part upon a recognition that various image-related characteristics, which are common to a set of photographic originals (e.g. the overall characteristics of a single filmstrip containing several transparencies) contain significant information for use in determining printing exposures.

For example, in implementing the invention, it has been found that the average optical density determined for a strip of transparencies (i.e., the overall strip being taken as a set) is effective as a basis for exposure determination. Moreover, such "set" characteristics prove especially useful as a supplement to other exposure information.

(While reference is made to a single "density" for convenience of explanation, it is to be understood that respective densities for each of the primary colors of light are preferably determined to provide exposure control for color printing.)

By employing characteristics for a set of transparencies (or other photographic originals) as partial or complete basis for exposure determination, elements of common photographic history for the set are introduced in the exposure determination, and the typical reliance of such determinations on the characteristics of the individual transparencies can be reduced or eliminated. Because "individual" characteristics become, according to the invention, less instrumental in the exposure determination, the tendency to overcorrection, which typically occurs for originals which purposely differ from norms for brightness and tone balance, is reduced. Additionally, various characteristics of the recorded image traceable to the film itself are, by selecting sets to include single filmstrips, compensated for automatically.

In a presently preferred implementation of the invention, the transparencies of a set are examined by sensing apparatus, preparatory to printing, to determine optical densities for the primary colors for each transparency. A computer or similar data handling apparatus receives the density information and calculates the "set" average densities (one for each color) from the individual densities. Then according to the aforementioned aspect of the invention, the "set" average densities are selectively weighted and combined, respective of color, with density parameters for each transparency which is readied for printing, to provide a set of composite parameters. The set of composite parameters then determines the exposures for the readied transparencies.

The factors used in weighting the density characteristics are derived empirically as is discussed more fully hereinafter.

It should be noted at this time that while reference has been made to "set" average optical density and while "set" average optical density is an effective and presently preferred "set" characteristic for exposure determination, it should not be inferred that it is the only effective "set" characteristic that is within the contemplation of the invention. Discussion relative to this point is included in portions of the description which follows.

In accordance with the foregoing, an object of the invention is to provide an exposure control apparatus for use in photographic printers which utilizes overall characteristics for a "set" or grouping of photographic originals in exposure determination.

Another object of the invention is to provide such an apparatus wherein an overall characteristic for a set of originals is combined with at least one characteristic for an original readied for printing to provide a selectively weighted composite parameter which is the basis for controlling printing exposure.

Still another object of the invention is to provide an exposure control apparatus, for use in photographic printers, which uses average measurements, for a set of originals as a whole, in combination with measurements for an individual original to be printed as a basis for exposure determination.

The invention, its objects, and advantages will become more apparent in the detailed description presented below.

In the detailed description reference is made to the drawings wherein.

Figure 1:
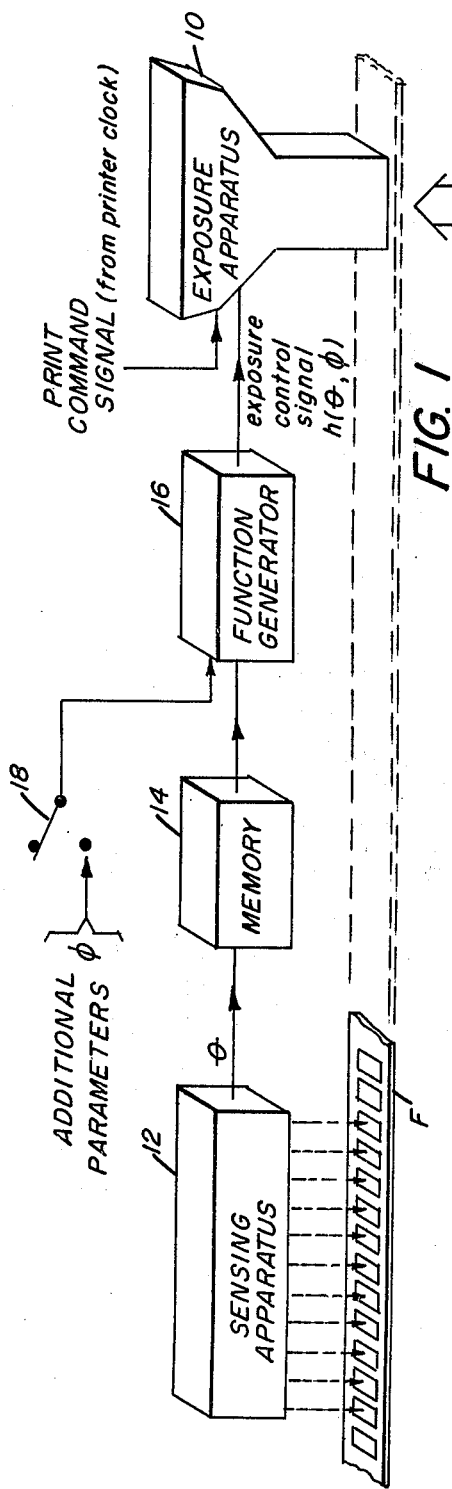
FIG. 1 is a simplified system diagram, generally in block form, which serves to illustrate the theory of the invention.

Considering first the general theory of the invention, reference is made to the simplified representation of FIG. 1. Discussion of details regarding implementation is deferred to the explanation of specific embodiments which follows the general theoretical discussion.

The apparatus outlined in FIG. 1 is intended for incorporation in a printer (not shown) of the type adapted to receive photographic originals in groups or batches (the originals are illustrated as the frames of a strip F). After receipt by the printer the frames travel along a transport path to a printing site where an exposure apparatus 10 is located. Printing exposures occur upon transmission to the exposure apparatus 10 of print command signals from the sequencing device of the printer, generally a printer clock (not shown). To permit adjustment for differences among originals, exposure apparatus 10 is of the type which regulates printing exposures responsive to control signals supplied in a suitable form.

According to the invention, the frames (more generally, the originals) of a batch are assigned to one or more sets, these sets, preferably, being chosen respective of underlying elements of common photographic history. Such common history would exist, for instance, where sets selected to include the frames of individual filmstrips or, as a further example, where all snow scenes from a series of filmstrips are assigned to a set.

A sensing apparatus 12 located along the transport path examines the frames of each set and produces, based upon such examination, a set-data signal $\theta$ representative of an image-related characteristic (e.g. the electrical capacitance quality, such capacitance corresponding to the quantity of silver contained in the frames of the set; or the average optical density) of the set as a whole. The set-data signal $\theta$ is stored in a memory device 14; and is transmitted to a function generator 16 when frames which are members of the set arrive at the printing site, ready for printing (data handling means for coordinating such transmission is described hereinafter).

Exposure determination according to the invention may be based solely on "set" characteristics or may consider "set" characteristics in combination with "other" characteristics such as the color optical densities of the individual frames. (This alternative is pictorally illustrated in FIG. 1 by a switch 18 positionable for introducing additional parameters $\phi$ as an input to the function generator 16.)

Figure 2:
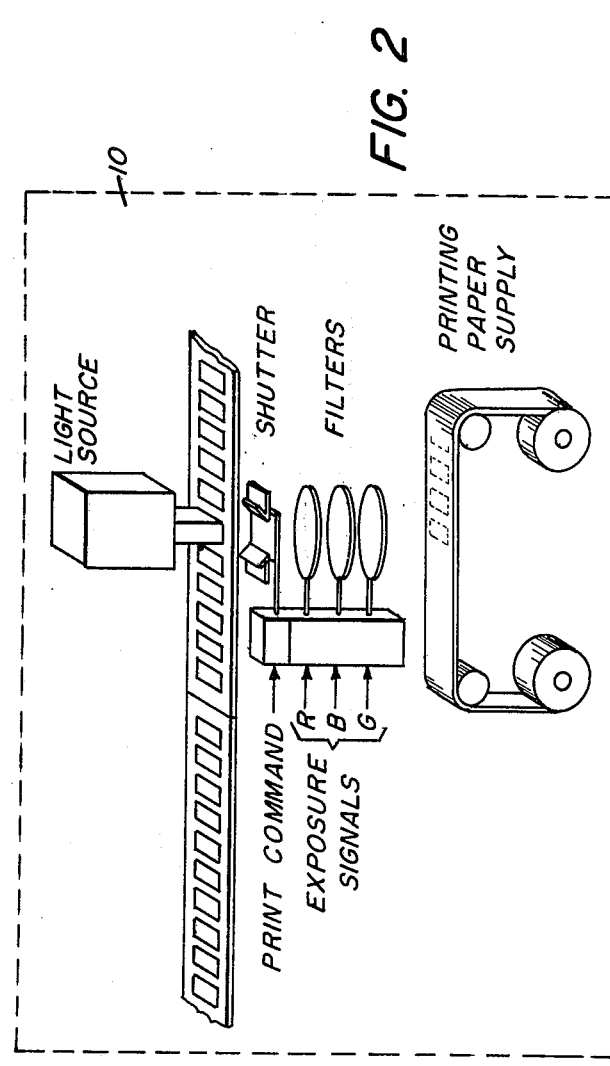
FIG. 2 is a pictorial illustration of an exposure apparatus suitable for use with the invention.

Signals applied to the function generator 16 are modified according to a predetermined functional relationship "h" to produce one or more exposure control signals. Preferably, the exposure control signals are suitable for direct application to the exposure apparatus 10 (see FIG. 2) for exposure regulation purposes; however, separate signal interfacing circuitry may be employed (e.g. where a digital-to-analog conversion is required). The actual printing exposures —regulated in accordance with the exposure control signals— are initiated by print command signals as mentioned previously.

To select the functional relationship "h", empirical methods are employed. Printing experts determine "target" exposures for individual originals from a sample population. The sample originals are assigned to sets according to the criterion to be used in implementing the invention (e.g. filmstrip membership as mentioned previously). Then the originals are examined by suitable sensing apparatus (say the apparatus to be used in implementing the invention) to produce a body of data representing the "set" (and "other" if any) characteristics of the sample population. By applying mathematical regression techniques (one of many references discussing regression techniques is the text "Statistical Analysis in Chemistry and the Chemical Industry" by C. A. Beinett and Norman L. Franklin, John Wiley and Sons, Inc. 1960) to analyze the data, a functional relationship ($h$) providing a best fit to the "target" exposures is determined (e.g. the best fit linear combination of "set" ($\theta$) and "individual frame" ($\phi$) optical density characteristics using a least squares criterion).

In a presently preferred form of the invention the functional relationship "h" is a selectively weighted linear combination of "set" ($\theta$) and "other" ($\phi$) characteristics as follows:

$$\text{``}h\text{''}$$

$$\begin{matrix} E_R \\ E_B = \\ E_G \end{matrix} \begin{bmatrix} K_{R1} & K_{R2} & K_{R3} & K_{R4} & K_{R5} & K_{R6} & K_{R7} \\ K_{B1} & K_{B2} & K_{B3} & K_{B4} & K_{B5} & K_{B6} & K_{B7} \\ K_{G1} & K_{G2} & K_{G3} & K_{G4} & K_{G5} & K_{G6} & K_{G7} \end{bmatrix} \cdot \begin{bmatrix} 1 \\ \theta_R \\ \theta_B \\ \theta_G \\ \phi_R \\ \phi_B \\ \phi_G \end{bmatrix}$$

Where
$K_{xy}$ = constants
$E_y$ = log exposures
$\theta_y$ = "set" parameters
$\phi_y$ = "other" parameters
R~ red, B~ blue, G~ green Through use of one of the known regression techniques, those constants ($K_{xy}$) are determined which provide a best fit to the "target" exposures. The constants are then programmed into the function generator 16. Such function generation is well known in the art and suitable digital (or analog) apparatus for this purpose is generally available. In fact, such operation is well within the capabilities of various types of small-scale digital calculating apparatus.

Figure 3:
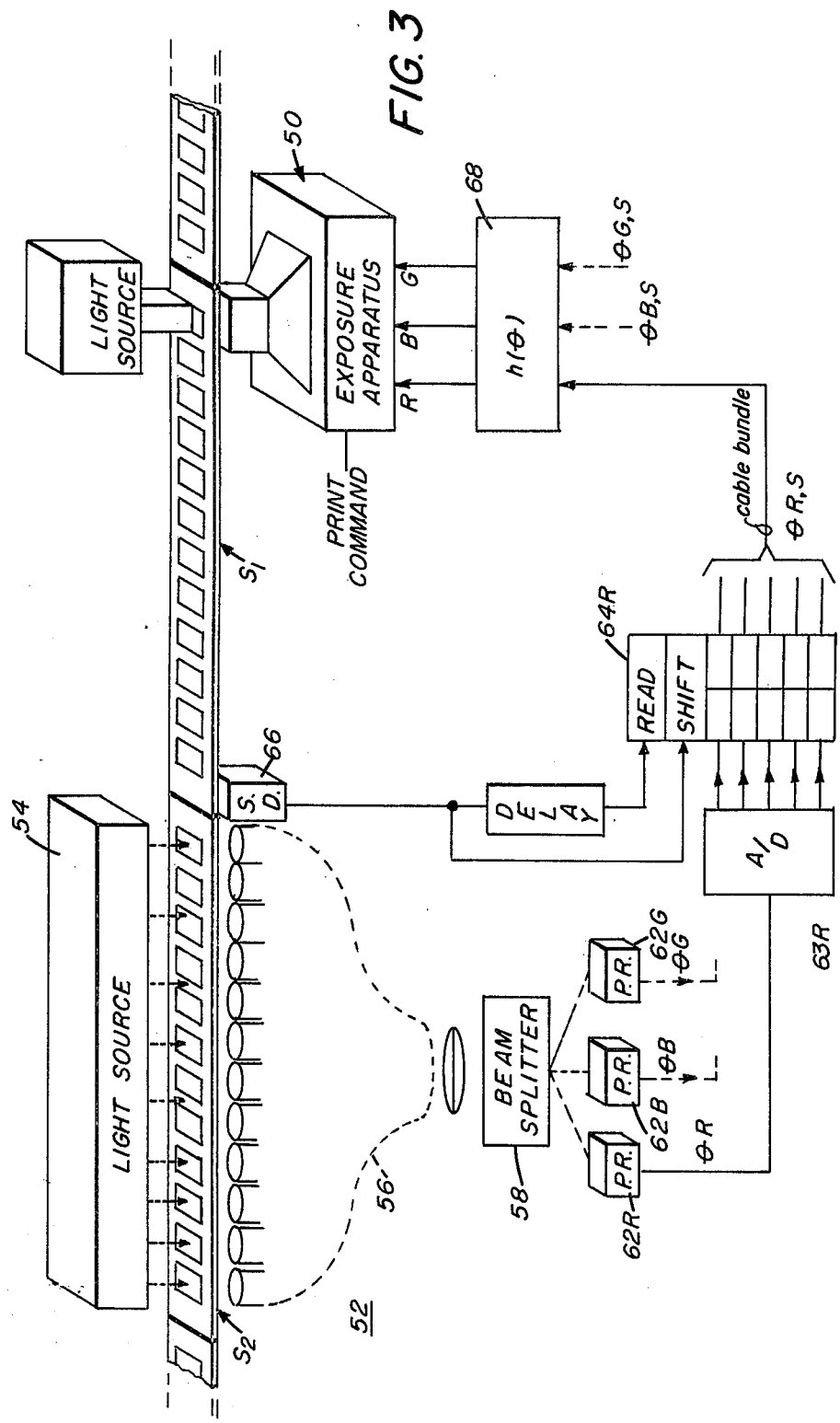
FIG. 3 is a diagram generally in block form of one implementation of the invention.

Referring to FIG. 3, an implementation will be described for use in printers of the type adapted to print frames from batches consisting of filmstrips spliced end to end (as is common for modern high speed printers). Filmstrips from such a batch, denoted $S_1$ and $S_2$ are indexed along a transport path of the printer (not shown) to a printing site, where an exposure apparatus 50 is located (the splices joining the filmstrips are indicated as darkened areas).

Upstream (i.e., opposite the direction of film transport) of the exposure apparatus 50, a sensing apparatus 52 examines the frames of each filmstrip to thereby produce a signal representing the average optical density for the filmstrip taken as a whole. The sensing apparatus 52 includes a source 54, for directing uniform light onto the film portion positioned within a predefined measuring zone, and a collector 56, composed of a series of light pipes, for receiving and bringing together light transmitted through the individual frames within the measuring zone. From the collector 56 the light passes to an optics system 58 which, by means of a beam splitter, distributes portions of the light to photoresponsive devices 62R, 62B, and 62G (each responsive to a different primary color as indicated by the suffixes R, B, G).

The output signal of each device 62 represents an average of transmission density (respective of color) for the series of frames in the measuring zone and, during intervals in which an entire filmstrip is positioned within the measuring zone, such signal is a set-data signal (the set assignment is inherently based on filmstrip membership and the number of frames in a filmstrip is taken as being fixed).

At this point, the description is directed, for purposes of clarity, to apparatus for processing only the red set-data signals: However, it is to be understood that essentially similar apparatus is provided to process the blue and green set-data signals as well.

The signal $\theta_R$ is sent to an analog-to-digital (A/D) converter 63R which in turn transmits a digital form of signal $\theta_R$ to a shift register 64R.

As mentioned above, a valid set data signal is available only during intervals in which a filmstrip is indexed to be fully within the measuring zone (as is the case for filmstrip $S_2$ as illustrated). Data acceptance by register 64R must, accordingly, be keyed to those intervals. Before discussing data acceptance more fully, however, data handling within register 64R will be considered:

As filmstrips arrive at the printing site, the corresponding set-data information is shifted to be accessable at the last or output stage of the register 64R. To effect such shifting, shift commands are provided to the register 64R which commands are keyed to filmstrip arrivals at the printing site. As a result of such operation, set-data information is caused to advance through the stages of register 64R in time with the advance of the corresponding filmstrips toward the printing site. Such data advancing (shifting) imposes a requirement that the number of stages in the register equals the number of filmstrips spaced in the transport gap from and including the measuring zone to and including the printing site (as illustrated two are required).

By spacing the printing site an integral number of filmstrips from the sensing apparatus 52 (as illustrated), data acceptance and data shifting are caused to occur during the same time intervals. However, with such an arrangement, data shifting must precede data acceptance; otherwise, loss of the data previously stored in the first stage of the register would occur as the new data is read in.

The above-described accept-data and shift commands are preferably provided for by locating a splice detector 66 immediately downstream of the sensing apparatus 52. A delay is interposed for the accept-data command to prevent new data from being read into register stage one over previously accepted data (this in effect produces a store-then-read command).

While the splice detector 66 is triggered by the splices between individual filmstrips, additional commands must be provided at the beginning and end of a batch. Thus, since no splice is present at the lead end of the batch an acceptdata command must be specially triggered for the first filmstrip.

Similarly, one or more additional commands may be required to shift the set-data information for filmstrips which are in the gap between the sensing apparatus 52 and the printing site as the batch is completed.

These additional commands are preferably provided by simulating splices at the leading and trailing ends of the batch. For example, splicing tape may be applied at both ends of the batch to trigger the splice detector 66 and thereby provide additional command signals.

Set-data information from the last stage of register 64R is transmitted to a function generator 68. The function generator 68 operates upon the set-data $\theta_R$ in accordance with a predetermined functional relationship to produce an exposure control signal which is in turn transmitted to the exposure apparatus 50. A technique for choosing the functional relationship has been discussed above.

Exposures regulated in accordance with the exposure control signals occur upon receipt at the exposure apparatus 50 of a print command from the clock or sequencing device (not shown) of the printer.

Figure 4:
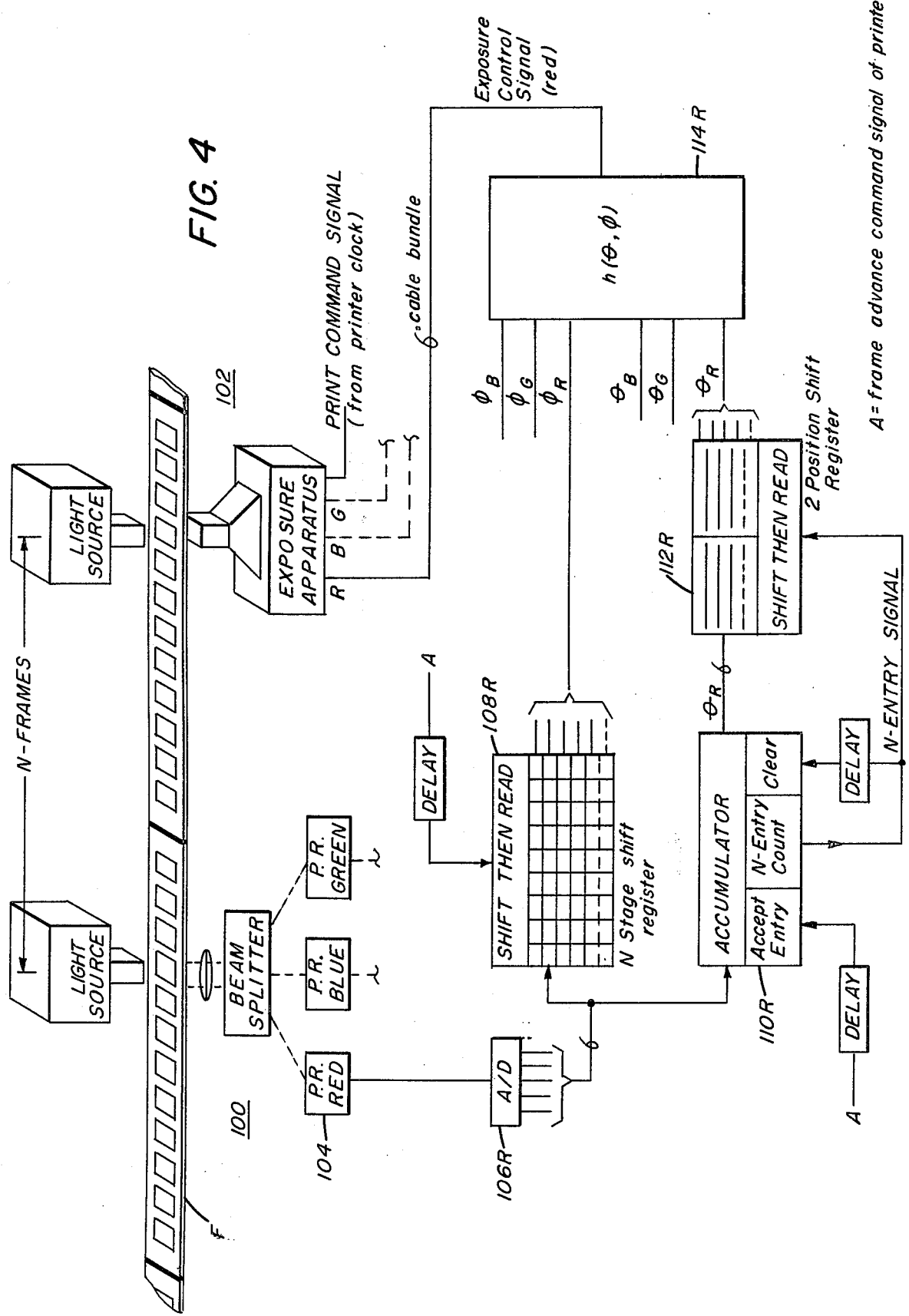
FIG. 4 is a diagram generally in block form illustrating a second implementation of the invention.

Referring now to FIG. 4, a presently preferred exposure control includes an apparatus 100 for sensing optical transmission characteristics of individual frames from a batch (illustrated as the film denoted F received for printing). Sensing apparatus 100 is located on a transport path defined within the printer and upstream of the printing site where an exposure apparatus 102 is located. Three photoresponsive devices 104 (one for each primary color), forming a part of the sensing apparatus 100, produce individual-data signals representing frame, optical density characteristics. (Again, for purposes of clarity, only the red signal processing apparatus will be described).

The individual-data signals are changed to digital form by an A/D converter 106R and are then sent to both a shift register 108R and an accumulator 110R. Within the shift register 108R, the individual-data signals are shifted forward as the frames advance along the transport path. Such operation is provided for by using the indexing signal (denoted A) from the printer clock to act as a shift then read command. By making the number of stages in register 108R equal the number (N) of frames spaced in the transport gap (the space from and including the exposure zone to and including the printing site), the frame information arrives at the last stage of register 108R as the corresponding frame arrives at the printing site.

Within accumulator 110R, frame information is totalized over a number of entries not exceeding N (the number of frames in the transport gap). The frames contributing to a single total (illustrated as equalling N) are in effect assigned to a "set" and the overall total, in coded signal form, is the setdata signal $\theta_R$ which represents the average optical density for the set. Preferably batch F includes a series of filmstrips having a fixed number of frames and N is chosen as the number of frames in a filmstrip.

Set-data signals from the accumulator 110R are read into a cooperating shift register 112R for storage. Data in the register 112R is shifted, by a command to shift-then-read. This command is produced by a counter associated with accumulator 110R when entries for all frames of a set have been received. With this arangement, the set-data information must arrive at the last register stage as the corresponding set arrives at the printing site. Preferably such operation is provided for by sizing the transport gap to accomodate a single set of frames and by including two stages in register 112R.

From the last stage of register 112R set-data information $\theta_R$ is transmitted to a function generator 114R which also receives individual-data information from register 108R. Techniques for choosing a functional relationship [$h(\theta, \phi)$] have been discussed above and the number and nature of the inputs to function generator 114R will depend upon that choice. As illustrated in FIG. 4, blue and green density information ($\phi_B$, $\phi_G$, $\theta_B$, $\theta_G$) is supplied for use in determining red exposures. The output of function generator 114R is the exposure control signal which is applied to regulate the printing exposure at exposure apparatus 102 (unless interfacing circuitry becomes desirable as discussed previously).

It should be appreciated that some economy of data storage can be realized by assigning only a portion of a filmstrip to each set. For example, the frames in the first half of a filmstrip can be assigned to a set and the corresponding set characteristic used for the entire filmstrip. As a side benefit such a reduction in set size permits the size of the transport gap to be reduced because fewer frames are examined in determining the set characteristics.

While the foregoing descriptions have, insofar as data processing is concerned, included relatively basic digital elements, it should be appreciated that such elements (or equivalents) would be available within various types of digital computers which are intended for process control applications. Through programming in an appropriate computer language, those skilled in the art could implement the concepts of the invention using such computers. In so implementing the invention, programming may provide for variable length sets to accomodate situations where filmstrips of differing lengths are included in a batch. Also, frames having densities outside a range considered acceptable (i.e., unprintable frames) could be eliminated from set membership by appropriate programming. Criteria reflecting photographic history other than filmstrip membership might also be implemented as a basis for set assignments; however, cooperating detection means would be necessary to inform the computer of the distinguishing characteristics when are to be recognized in such set assignments.

The invention has been described with particular reference to preferred forms thereof, however, it should be appreciated that variations and modifications can be effected within the spirit and scope of the invention. For example, a variety of frame and "set" characteristics (not necessarily optical) can provide information effective in exposure determination and these characteristics may be combined in various ways to serve as a basis for such determination. Furthermore, as indicated above, sets may be assigned in view of criteria other than filmstrip membership; for example, image content (snow scenes and beach scenes) and lighting conditions (flash and non-flash). Or sets may be made up of only a portion of a filmstrip (e.g. the frames of the first half of the filmstrip). As a further modification, known types of analog apparatus can be employed for data processing purposes as a substitute for the digital apparatus described.

I claim:
1. In a photographic printer of the type adapted to receive batches of originals for photographic copying and wherein there is provided an exposure apparatus of a type which regulates printing exposures in response to a control signal, an apparatus for supplying such a control signal comprising:
  means for examining originals from such a batch individually to produce individual-data signals representative of an optical density characteristic;
  said examining means including means for assigning originals to individual sets;
  means for processing individual-data signal information, according to set assignment, to produce at least one set-data signal representative of an overall characteristic of a set of the originals; and
  signal processing means for receiving both individual-data signals and set-data signals, and for responding to such received signals in accordance with a preselected functional relationship to produce at least one control signal for regulating printing exposure, said signal processing means including means for transmitting the control signal to said exposure apparatus.

2. An apparatus according to claim 1 wherein said combining means produces set-data signals by averaging the individual-data signals for each set.

3. An apparatus according to claim 1 wherein said preselected functional relationship results in a linear combination of individual-data and set-data signals.

4. In a photographic printer which is of the type adapted to receive frames for copying in the form of batches of spliced filmstrips and wherein there is provided an exposure apparatus of a type which regulates printing exposures in response to a control signal, an apparatus for supplying such a control signal comprising:
  means for examining such frames and for producing, based upon such examination, individual data signals based on an image-related characteristic of the individual frames, and at least one set-data signal representative of image-related characteristics of a selected group of the frames taken as a whole; and
  signal processing means for receiving, as inputs, both the individual-data signals and the set-data signals and responding to such received signals in accordance with a predetermined functional relationship to produce at least one exposure control signal, said signal processing means including means for transmitting the exposure control signal to said exposure apparatus.

5. An apparatus according to claim 4 wherein said signal processing means produces said control signals based on a linear combination of set-data and individual-data signal information.

6. An apparatus according to claim 4 wherein said image-related characteristic is an optical density characteristic.

7. An apparatus according to claim 4 wherein said examining means includes (1) sensing means for producing individual-data signals representing an optical density characteristic of the individual frames, (2) detector means for detecting the individual filmstrips within a batch, and (3) means, cooperating with said detector means, for combining individual-data signal information for at least a plurality of the frames in each filmstrip to produce said set-data signals.

\* \* \* \* \*